(12) United States Patent
Graichen et al.

(10) Patent No.: US 7,107,491 B2
(45) Date of Patent: Sep. 12, 2006

(54) SYSTEM, METHOD AND COMPUTER PRODUCT FOR PERFORMING AUTOMATED PREDICTIVE RELIABILITY

(75) Inventors: Catherine Mary Graichen, Malta, NY (US); Aidan Thomas Cardella, Schenectady, NY (US); Raymond Louis Nicolia, Jr., Erie, PA (US); Lucille Anna Feher, Glenville, NY (US); Brock Estel Osborn, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 455 days.

(21) Appl. No.: 09/681,652

(22) Filed: May 16, 2001

(65) Prior Publication Data

US 2002/0174384 A1 Nov. 21, 2002

(51) Int. Cl.
G06F 11/00 (2006.01)

(52) U.S. Cl. .............................. 714/37; 714/26; 714/47; 714/48

(58) Field of Classification Search ................ 714/741, 714/37, 47, 48, 26, 25; 703/13
See application file for complete search history.

(56) References Cited

U.S. PATENT DOCUMENTS

| | | | |
|---|---|---|---|
| 4,965,743 A | | 10/1990 | Malin et al. |
| 5,539,652 A | | 7/1996 | Tegethoff |
| 5,596,712 A | * | 1/1997 | Tsuyama et al. ............... 714/26 |
| 6,226,597 B1 | * | 5/2001 | Eastman et al. .............. 702/34 |
| 6,324,659 B1 | * | 11/2001 | Pierro ........................ 714/48 |
| 6,530,065 B1 | * | 3/2003 | McDonald et al. ............ 716/4 |
| 6,532,426 B1 | * | 3/2003 | Hooks et al. ................. 702/81 |
| 6,557,118 B1 | * | 4/2003 | Scheleiss et al. ............. 714/37 |
| 2002/0078403 A1 | * | 6/2002 | Gullo et al. ................. 714/37 |
| 2002/0091972 A1 | * | 7/2002 | Harris et al. ................. 714/47 |

OTHER PUBLICATIONS

A. Basu, et al Statistical Methods For the Reliability of Repairable Systems, PP. 5–92, 1997.
L. Crow, Reliability Analysis For Complex, Repairable Systems, Reliability and Biometry, Statistical Analysis of Lifelength, Philadelphia, 1974, PP. 379–410.
US 2002/0013643 A1, Ishii et al., "Method and Equipment for Assessing the Life of Members Put Under High In–Service Temperture Environment for Long Period," Jan. 21, 2002.
International Search Report, PCT/US02/14125, Jul. 12, 2002.

* cited by examiner

Primary Examiner—Robert Beausoliel
Assistant Examiner—Yolanda Wilson
(74) Attorney, Agent, or Firm—Richard A. DeCristofaro; Patrick K. Patnode (57) ABSTRACT

System, method and computer product for performing automated predictive reliability. A data acquisition component acquires service data for a complex system from a data repository. A statistical analysis component generates a statistical model for the service data. A simulation component predicts the reliability of the complex system according to the statistical model. An alert generation component generates alerts when predicted failures determined by the simulation component exceed predetermined alert criteria. A report generation component generates a summary of the analysis performed in the data acquisition, statistical analysis and alert generation components.

18 Claims, 5 Drawing Sheets

WeibullPlot

Predictions v.s. Expected over

SYSTEM, METHOD AND COMPUTER PRODUCT FOR PERFORMING AUTOMATED PREDICTIVE RELIABILITY

BACKGROUND OF INVENTION

This disclosure relates generally to improving quality of products and systems and more particularly to predicting the reliability of a product or system.

Generally, reliability is the quality of a product or system over time. This includes the likelihood that the product or system will operate reliably without breaking down and the likelihood that the product or system will last as long as expected. As more companies become concerned with the servicing of their products and systems, it becomes necessary to have an understanding of the reliability of the products and systems. This becomes even more necessary for complex systems such as locomotives, aircraft engines, automobiles, turbines, computers, appliances, etc., where there are many subsystems each having hundreds of replaceable units or components. If there is an understanding of the reliability of the systems, then future failures can likely be anticipated and any downtime associated with correcting the failures can likely be kept to a minimum.

Currently, system engineers address reliability problems using a manual process after the problems have occurred. In this process, system engineers extract data for the system, which includes data from the subsystems and each of their components. The system engineers analyze the data and try to understand the reason or reasons for the failures at the component level. The engineers can then use this understanding to predict future failures of the components. One problem with this manual process is that the prediction of future failures is not very reliable because the results from one engineer to the next will vary because each has their own particular method of analyzing data and understanding failures. Another problem with the manual process is that analyzing data and understanding failures for the components becomes an overwhelming task as the volume of data increases. Still another problem with the manual process is that it cannot deal with problems until they occur. If there was a process that had the capability to predict failures on a consistent and accurate basis, then potential problems could be addressed quickly so that downtime is kept to a minimum.

In order to overcome the above problems, there is a need for an automated approach that can analyze a large amount of data for complex systems and predict failures on a consistent basis before there is actually a problem.

SUMMARY OF INVENTION

In a first embodiment, there is a system, method and computer readable medium that stores instructions for instructing a computer system, to perform automated predictive reliability on a complex system having a plurality of subsystems and a plurality of component within each subsystem. In this embodiment, service data is acquired for the plurality of components of at least one of the plurality of subsystems. Age information and failure information is determined from the service data for each of the plurality of components. A statistical model is generated according to the age information and failure information. Future failures for the life cycle of the plurality of components are predicted according to the statistical model.

In another embodiment, there is a system that performs automated predictive reliability on a complex system having a plurality of subsystems and a plurality of components within each subsystem. In this system, there is at least one data repository containing a plurality of service data for the plurality of subsystems and components. A predictive reliability system predicts the reliability for the plurality of components of at least one of the plurality of subsystems according to the plurality of service data. The predictive reliability system comprises a data acquisition component that acquires the plurality of service data from the at least one data repository. Age information and failure information is determined from the service data for each of the plurality of components. A statistical analysis component generates a statistical model according to the age information and failure information. A simulation component predicts future failures for the life cycle of the plurality of the components according to the statistical model. A computing unit is configured to serve the at least one data repository and the predictive reliability system.

In a third embodiment, there is a method and computer readable medium that stores instructions for instructing a computer system, to perform predictive reliability on a complex system having a plurality of subsystems and a plurality of components within each subsystem. In this embodiment, a user is prompted to select a plurality of components of at least one of the plurality of subsystems. In response to the user selection, service data is acquired for the selected plurality of components. Age information and failure information is determined from the service data for the selected plurality of components. A statistical model is generated according to the age information and failure information. Future failures for the life cycle of the plurality of components are predicted according to the statistical model.

DETAILED DESCRIPTION

Figure 1:
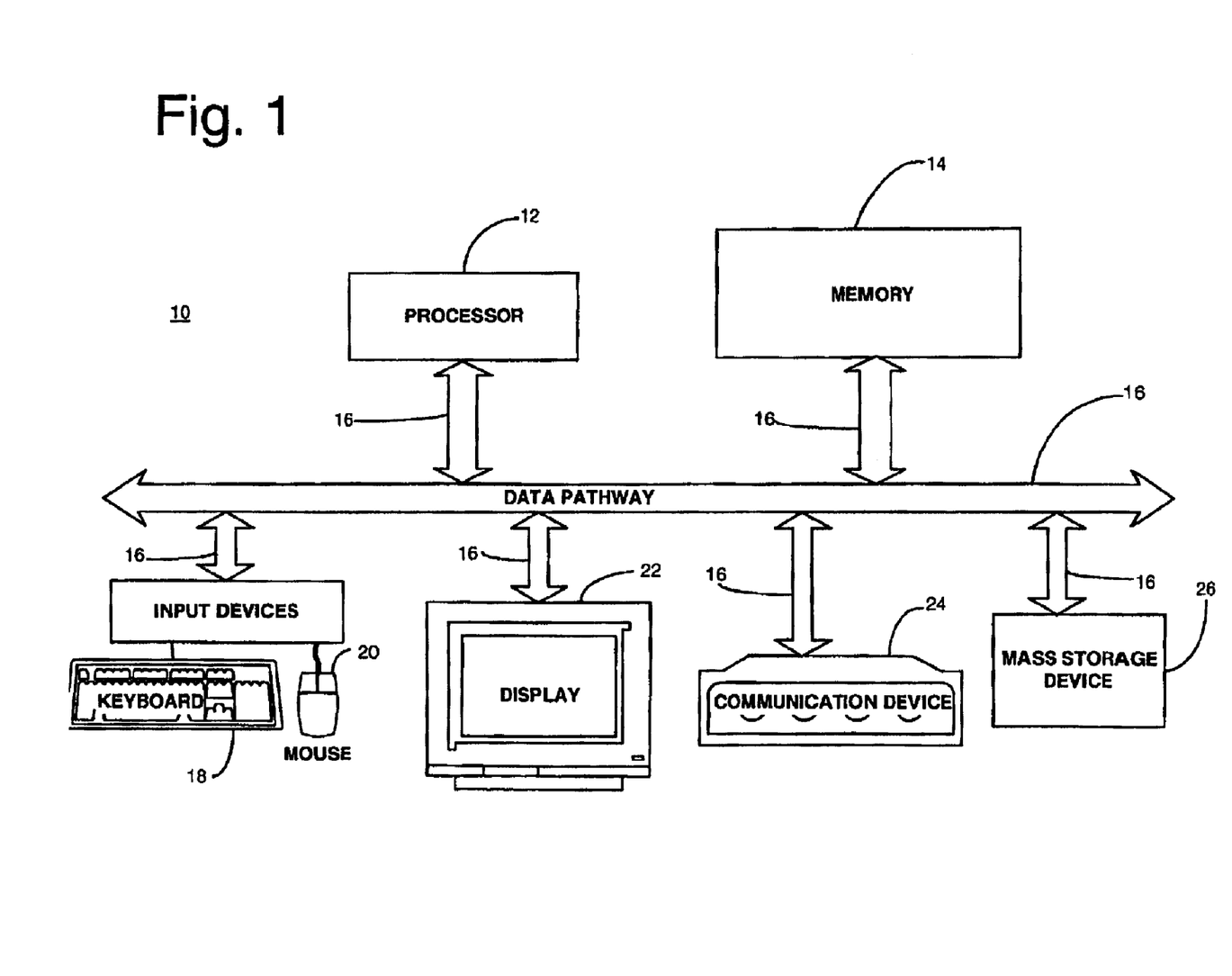
FIG. 1 shows a schematic diagram of a general-purpose computer system in which a system for performing predictive reliability operates.

This disclosure describes a system, method and computer product for performing predictive reliability on a complex system such as a locomotive, automobile, turbine, computer, appliance; however, the disclosure is applicable to any system where it is desirable to improve quality and avoid reliability problems. FIG. 1 shows a schematic diagram of a general-purpose computer system 10 in which a system for performing predictive reliability operates. The computer system 10 generally comprises a processor 12, memory 14, input/output devices, and data pathways (e.g., buses) 16 connecting the processor, memory and input/output devices. The processor 12 accepts instructions and data from memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a handheld digital computer, personal digital assistant computer, notebook computer, personal computer, workstation, mini-computer, mainframe computer or supercomputer.

Figure 2:
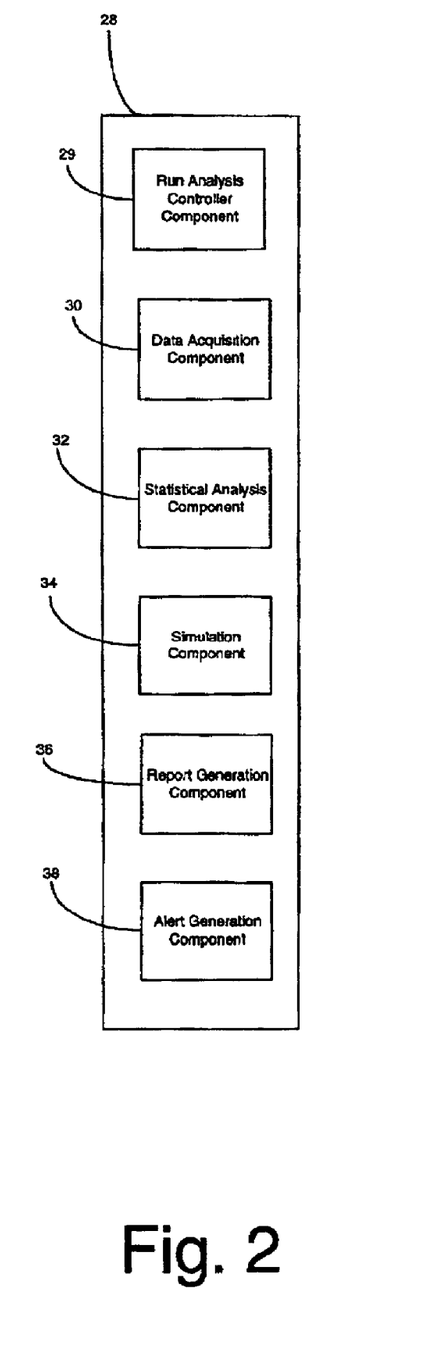
FIG. 2 shows a top-level component architecture diagram of the predictive reliability system that operates on the computer system shown in FIG. 1.

FIG. 2 shows a top-level component architecture diagram of a predictive reliability system 28 that operates on the computer system 10 shown in FIG. 1. Generally, the predictive reliability system 28 predicts the reliability for complex systems that have a plurality of subsystems and a plurality of components within each subsystem. More specifically, the predictive reliability system 28 predicts and reports future failure rates for components or groups of components in each subsystem based upon reported service data. The predictive reliability system 28 comprises a run analysis controller component 29 that initiates the analysis for a particular subsystem. Associated with each subsystem is a set of analysis cases, wherein an analysis case is a single data set of service data extracted from a historical database. Generally, the service data includes one or more codes representative of the components that comprise the subsystem, a time limit representative of a threshold for deciding whether to run an analysis case when no new failures have occurred and a set of filters that determines the data set to extract. In this disclosure, the run analysis controller component 29 selects the subsystem that has the earliest analysis run completion date, however, one of ordinary skill in the art will recognize that other criteria can be used to select a subsystem. This approach may be helpful in routinely analyzing complex systems that comprise many subsystems and components in each of the subsystems. For example, if the system had 14 subsystems, then the run analysis controller may run an analysis once every two weeks for a subsystem. This scenario would allow the predictive reliability system to devote a day to each specific subsystem with a subsequent analysis performed every 14 days. The scheduling of running an analysis for a subsystem is flexible and is left to the discretion of the user of the system.

A data acquisition component 30 acquires service data residing in a data repository for the selected subsystem and its components. The data acquisition component 30 acquires the service data by using filters that define each data set to construct a query to extract the data records from the data repository. The service data varies depending on the system being evaluated. Generally, the service data comprises information such as the date that the system and subsystems were first put into service, components that have experienced failures, dates that the components experienced the failures and the position or positions of the failed components with respect to the other components. Other service data may include any changes made to the components. Additional service data may include definitions of the subsystems and components, repair history of the product (e.g., dates of service events, types of service events, etc.), as well as any factors which may play a role in explaining the length of time which passes between service events (e.g., environment, operating conditions of the subsystems and components, product configurations, etc.).

The data acquisition component 30 uses the service data to determine age information and failure information for each of the components. To determine the age information of a component, the data acquisition component 30 uses the date that the component went into service (i.e., the in-service date) and the date of any failures which resulted in the component being changed. If a component has not had a failure, then the data acquisition component 30 subtracts the latest in-service date of the component from the current date. If the component has had a failure, then the data acquisition component 30 subtracts the latest failure date from the current date. To calculate the age value of failed components where the unit has only one failure, the data acquisition component subtracts the in-service date from the failure date. If the component has multiple failures, then the data acquisition component 30 subtracts the in-service date from the earliest failure date and for each additional failure, subtracts the previous failure date from the failure date for that failure.

In addition, the data acquisition component 30 uses the service data to determine failure information for each of the components. In particular, the service data contains a field to identify the reason the component was replaced. The reasons are used to identify if the part failed or was replaced for another reason. Failures and non-failures (or censors) observations are used to fit a statistical distribution which approximates the historical experience of the data set.

A statistical analysis component 32 generates a statistical model from the age information and failure information determined by the data acquisition component 30. Generally, well known parametric statistical models are used to characterize the reliability of the system, and these parameters are estimated from the age and failure information using well known techniques like maximum likelihood. In this disclosure, the statistical model is a Weibull distribution model, however, other models such as a lognormal, exponential or gamma distributions can be used. The two parameters which characterize the Weibull distribution model are the scale or characteristic life parameter which indicates the point in time by which the subject part has a 63% chance of failing and the shape parameter which indicates whether the failure rate is increasing, decreasing or remaining constant over time.

The statistical analysis component 32 may perform other functions in addition to generating a statistical model. For example, the statistical analysis component 32 may execute a plurality of statistical procedures that comprise a multivariate regression and/or a correlation analysis of the age information and failure information. The statistical analysis component 32 may output this information as statistical diagnostics and residual plots. The statistical diagnostics may include goodness-of-fit metrics and collinearity diagnostics.

In addition to the statistical diagnostics and residual plots, the statistical analysis component 32 may generate additional information such as probability plots, which enable one to assess whether the distribution for each component is appropriate or not. Another function that may be performed includes generating a plot of residuals versus the parameters for the age and failure information. Also, the statistical analysis component 32 may determine a standard error with the age and failure information parameters. Other statistics determined by the statistical component 32 may be the confidence limits on the Weibull distribution model.

A simulation component 34 predicts future failures for the life cycle of the components according to the statistical model. To predict the future failures for the life cycle of a component, the simulation component 34 randomly chooses the remaining life (i.e., the number of days) for each active unit having a Weibull distribution model associated therewith. As a failure is predicted, the simulation component 34 assumes that the component with the failure is replaced by a new part. The simulation component 34 then repeats the prior step to predict the remaining life of the new part until the desired life cycle time for the component has been reached. The simulation component 34 performs this process for each unit in the data set. The entire simulation process is repeated for a specified number of iterations (e.g. 1000 iterations). As a result, components in the various subsystems may have different numbers of part life cycles and different iterations may have different numbers of part life cycles for the same unit. In this disclosure, one simulation iteration is defined as the prediction of failures through the entire analysis time period for the components on all the units. For each iteration, the simulation component 34 determines the number of failures in each time period.

In addition to the above functions, the simulation component 34 determines certain statistics on the predictions when the simulation iterations have been completed. For example, the simulation component 34 determines uncertainty bounds for the number of failures in each time period based on the predictive uncertainty from the distributions generated by the set of iterative results.

A report generation component 36 compiles results produced from the simulation component 34 into an analysis report. Generally, the analysis report contains a summary of the filters describing the data set, and the results determined by the data acquisition component 30, statistical analysis component 32 and simulation component 34. Some examples of filters reported may include the model of the system, subsystem(s), component(s), customer information, data ranges, number of time periods and length of the time periods. Some examples of results reported from the data acquisition component 30 may include the number of units, the number of failures, the time to retrieve the data set from the data repository, and warnings about invalid age calculations. Some examples of results reported from the statistical analysis component 32 may include a warning message if a predetermined minimum of failures necessary for the selected time period is not found, warning message if the shape parameter for the Weibull distribution model is outside of realistic limits, warning message if the age of the determined failure information is less than the total of the time periods to predict. Other items that the report may show are a plot of the Weibull distribution model fit to historical failures along with the confidence limits. Some examples of results reported from the simulation component 34 may include the Weibull distribution model parameters, a plot of the Weibull distribution model fit to predicted data, including the confidence limits on the Weibull distribution model, failure predictions by each time period and upper and lower uncertainty bounds for the number of failures.

An alert generation component 38 generates alerts for the predicted future failures. Generally, the alert generation component 38 evaluates the results from the simulation component 34 and determines if the results trigger predetermined flagging criteria. To determine if a predetermined flagging criteria is triggered, the alert generation component 38 compares the mean of the predicted failures to a predetermined allocation of expected failures set for the component for each time period. Allocations for each component are created by dividing the overall reliability failure rate for the system to each subsystem and then to each component. If the mean of the predicted values exceeds the allocated value by more than a predetermined threshold percent, then the alert generation component 38 shall generate a flag. Note that the threshold percent may be positive or negative. A negative value indicates that the predicted failure is better than or less than the allocation of expected failures. For example, a threshold percent of 10% would indicate that the selected data set failure should be 10% better (i.e., less) than the allocated value. At the completion of comparing the data, the alert generation component 38 can send an email notification to a user or user group listing the components that have generated flags as well as links to the reports that provide more details explaining the alerts.

In addition, the alert generation component 38 is not limited to alerting users based only on comparison with allocations. One of ordinary skill in the art will recognize that the alert generation component 38 may generate alerts based on shifts of the predicted distribution with past prediction distributions or on comparisons between similar groups of units where groups might be considered similar if they are of similar vintage, or similar model, or similar operating conditions.

In addition, the predictive reliability system 28 is not limited to the run analysis controller component 29, data acquisition component 30, statistical analysis component 32, simulation component 34, report generation component 36 and alert generation component 38. One of ordinary skill in the art will recognize that the predictive reliability system 28 may have other components. For example, the predictive reliability system 28 could also include a configuration component to maintain the internal information about the runs, units, who to contact for alerts, etc. or a cost component to predict costs from the failures.

Figure 3:
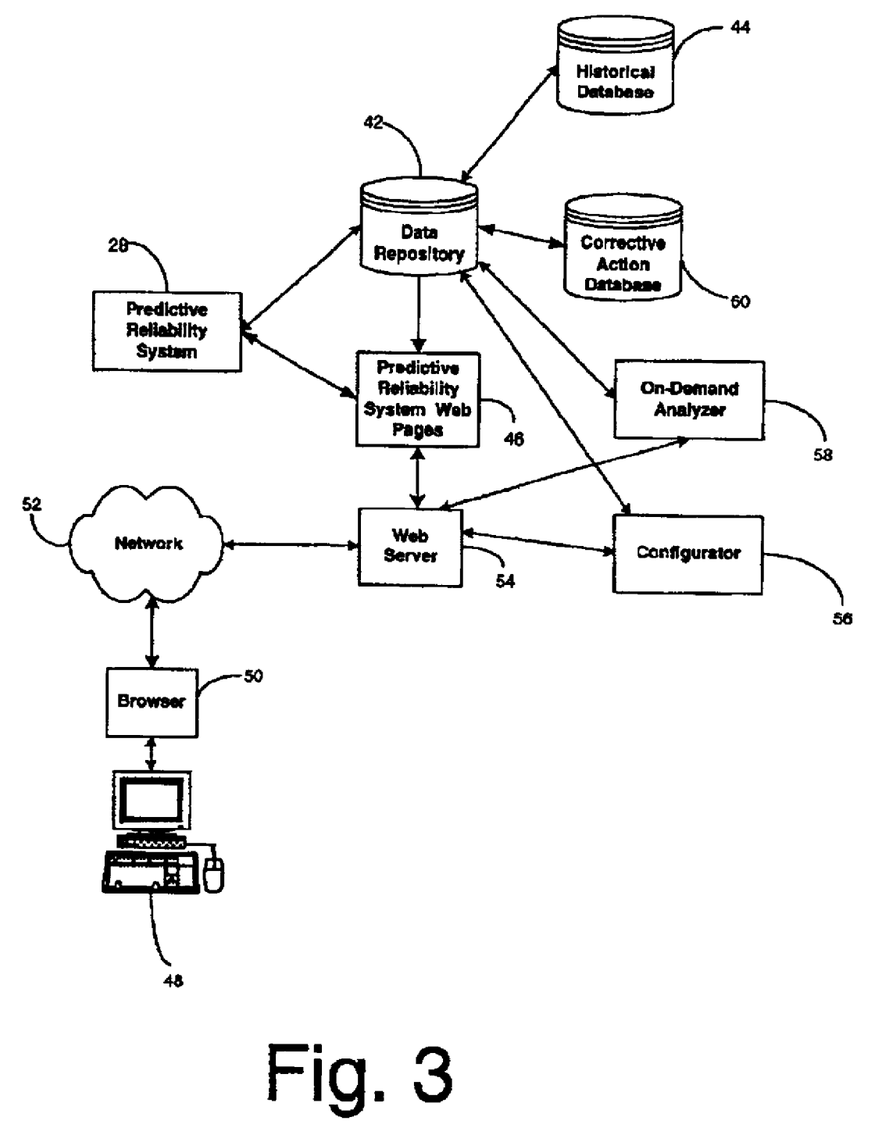
FIG. 3 shows an architectural diagram of a system for implementing the predictive reliability system shown in FIG. 2.

FIG. 3 shows an architectural diagram of a system 40 for implementing the predictive reliability system 28 shown in FIG. 2. In FIG. 3 there is a data repository 42 that stores service data such as configuration information, data related to the system such as definitions of the subsystems and components and analysis results. The configuration information may include information for customers, system models, analysis cases, users, Weibull distribution model parameters, storage requirements, etc. A historical database 44 contains historical service information such as the date that the system and subsystems were first put into service, components that have experienced failures, dates that the components experienced the failures and the position or positions of the failed components with respect to the other components. In addition, the historical database 44 may comprise other service data such as changes made to the components, repair history of the product (e.g., dates of service events, types of service events, etc.), and factors which may play a role in explaining the length of time which passes between service events (e.g., environment, operating conditions of the subsystems and components, product configurations, etc.). Service information may be input into the historical database 44 manually when the unit is repaired. Alternatively, service information may be input into the historical database 44 by combining information with other systems which capture the parts used during repair events. During the input process, users may be asked to supplement the data collection process with more details about the failure and repair.

In operation, the predictive reliability system 28 retrieves configuration data from the data repository 42 as well as analysis data including specific simulation configuration options. The data repository 42 is linked to the historical database 44 in order to access historical service data such as the failure data. The predictive reliability system 28 uses the information from the data repository 42 and the historical database 44 to predict the future failures for the life cycle of components based on a predefined set of analysis cases. The predictive reliability system 28 stores the analysis results in the data repository 42. When the analysis of the set of cases is completed, the predictive reliability system determines which cases have alerts and notifies the appropriate contacts.

The report generated from the predictive reliability system 28 is provided to an end-user in the form of web pages sent from a predictive reliability system web site 46. Generally, a hierarchical drill-down model helps the end-user navigate the various portions of the report. The web pages are dynamic because the pages retrieve the report data from the data repository 42 and put them in suitable form for the end-user. The dynamic web pages can be in the form of HTML, however, other formats and structures can be used such as SGML, XML or XHTML.

A computing unit 48 allows the user to access the web pages 46. The computing unit 48 can take the form of a hand-held digital computer, personal digital assistant computer, notebook computer, personal computer or workstation. The user uses a web browser 50 such as Microsoft INTERNET EXPLORER, Netscape NAVIGATOR or Mosaic to locate and display the various items of the report generated from the predictive reliability system 28 on the computing unit 48. A communication network 52 such as an electronic or wireless network connects the computing unit 48 to the web pages 46 through a web server 54, which serves the pages. The computing unit 48 may connect to the web server 54 through a private network such as an extranet or intranet or a global network such as a WAN (e.g., Internet).

Once a user has received an e-mail notification of an alert or viewed an analysis report, he or she can use the system 40 to perform several functions. For example, once a user has received an email notification of an alert, then he or she can assess if the alert should be documented as a high priority concern, request more records from the historical database in order to perform a more detailed analysis, check warnings and other messages associated with the alert, compare the analysis case with other cases, examine past performances of the component or compare the performance predictions with any current failures noted by service representatives. Some items that a user may decide to perform after viewing an analysis report include developing an understanding of the expected costs and risks associated with the predicted failures and an understanding of the planning of repairs (i.e., parts, labor, etc.) for correcting the predicted failures. An understanding in these areas will enable one to efficiently manage the risks associated with servicing the complex system and respond to customer needs in a prompt and effective manner.

If desired, the system 40 may have functionality that enables authentication and access control of users accessing the web pages 46 linked to the predictive reliability system 28. Both authentication and access control can be handled at the web server level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database; however, other directory type databases with other types of schema may be used including relational databases, object-oriented databases, flat files, or other data management systems.

A configurator 56 provides a user interface that enables a user to edit configuration information. Generally, the configurator 56 is a web application containing a set of dynamic web pages and forms that enable the user to edit the configuration information. This includes the set of analyses to be run for each subsystem, definitions of the users for each subsystem group, parameters required to perform the simulation and parameters to operate the system. In addition, the configurator 56 allows a user to define new analysis cases for the system, update analysis run definitions and further customize the automated processing performed by the predictive reliability system. Furthermore, the configurator 56 enables a user to add new customers, models, subsystems and components to the set available for analysis. Also, the configurator 56 coordinates with other systems within the organization to identify the available set. With the addition of new entities to the predictive reliability system 28, new analysis cases may be constructed automatically.

The system 40 may also include an on-demand analyzer 58 that enables a user to receive the results from the predictive reliability system 28 interactively through a web application containing a set of dynamic web pages and forms. To receive the results on-demand, the user defines a set of filters (e.g., subsystem, component, customer, etc.) that determine what data sets to extract. Once the filters have been set, then the predictive reliability system 28 performs the above-mentioned functions (i.e., data acquisition, statistical analysis, simulation, report generation and alert generation). The user receives the analysis results and any alerts after the analysis has been performed by the predictive reliability system. On-demand functionality allows more flexibility for the user to refine or combine data sets, for instance combining several similar sets of units or restricting a data set by dividing them by the dates the units started service to search for differences due to manufacturing dates.

Another functionality that the system 40 may provide is the ability to provide a candidate set of corrective actions for any alerts that have been generated. A corrective action database 60 stores a variety of corrective actions that can be used to fix anticipated or incipient failures for the many components associated with each of the subsystems in the system. As described above, users may take a variety of actions upon receiving alerts. The organization may decide to formalize those steps by constructing a corrective action system. If so, then the predictive reliability system 28 may enter input into such a system defining alerts. The process may restrict which alerts are entered based on several criteria, including the prediction values (e.g. new alert criteria), whether an existing corrective action has already been defined for the alert (to avoid needless repetition of the same alert), or the potential cost or customer impact.

Figure 4:
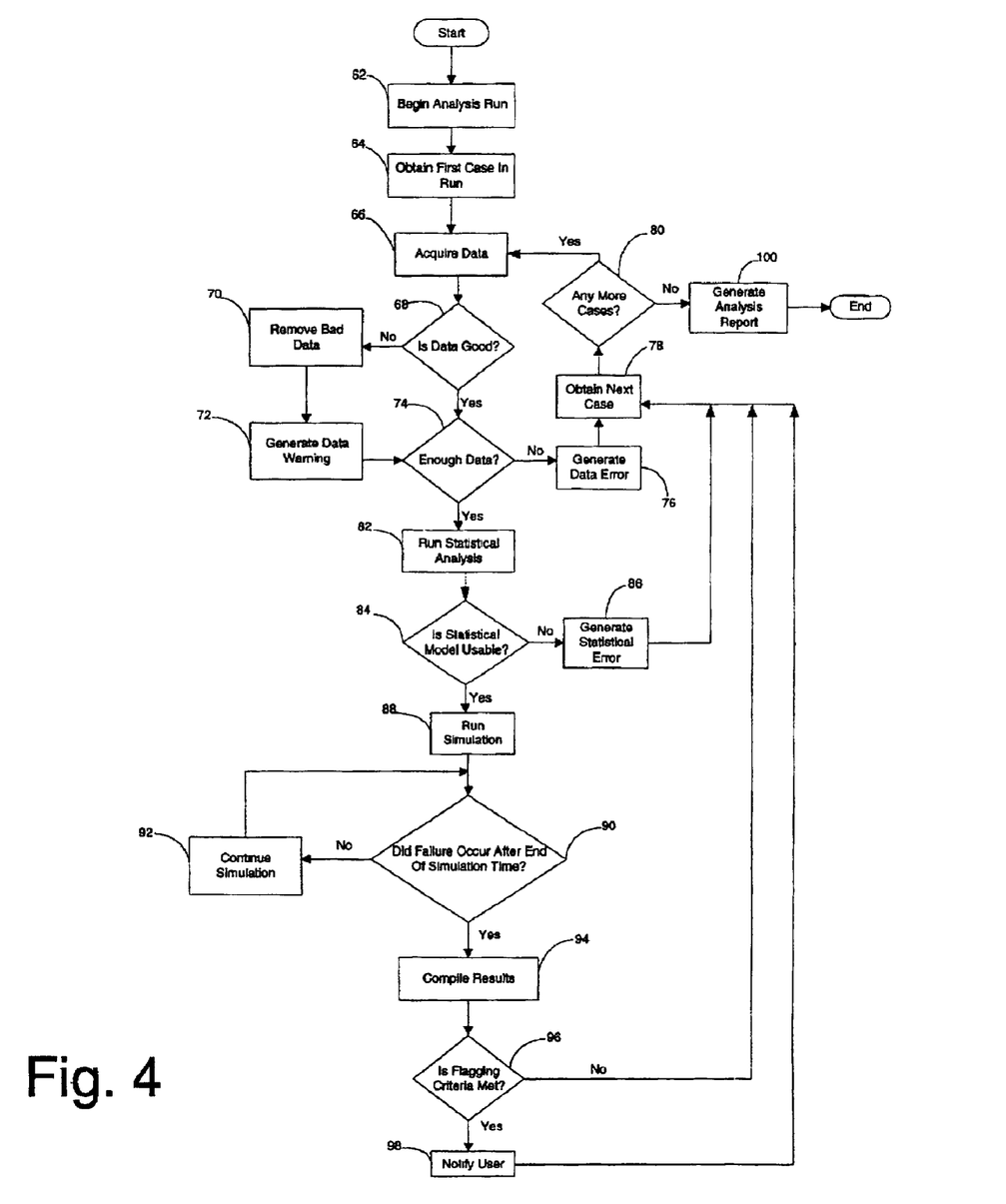
FIG. 4 shows a flow chart describing actions performed by the predictive reliability system shown in FIG. 2.

FIG. 4 shows a flow chart describing actions performed by the predictive reliability system 28 shown in FIG. 2. At block 62, the run analysis controller component initiates an analysis run for a particular subsystem. An analysis run is a set of analysis cases analyzed together by the predictive reliability system 28. To initiate the analysis run, the run analysis controller component selects the subsystem that has the earliest analysis run completion date. Generally, the run analysis controller component records the start date and completion date of an analysis run. In addition, the predictive reliability system records the completion date of each analysis case. Alternatively, the analysis run can be specifically chosen and executed. Using the analysis run definition, the run analysis controller component 29 retrieves the analysis cases defined for the subsystem.

The run analysis controller component 29 executes all of the retrieved analysis cases that meet a predetermined criteria. Some examples of predetermined criteria may include a flag that indicates that an analysis case must be executed, a failure is identified in the extracted data set for the analysis case that occurred since the last time the analysis case was executed, an analysis case that has not been executed before (i.e., there is no recorded completion dates) or a certain number of days have elapsed since the last execution of an analysis case. These are only a few examples of possible criteria that can be used to retrieve analysis cases. One of ordinary skill in the art will recognize that there are many other possible forms of criteria that can be used.

After the analysis run has been initiated, then the data acquisition component gets the first analysis case at 64. Then the data acquisition component acquires the data for the current case at 66 by selecting the records from the data repository that satisfies the analysis case filters. As mentioned above, the data acquisition component determines an age value for each record in the extracted data set. In addition, the data acquisition component identifies whether each record of the data set represents a failure or a censor. In this disclosure a "1" is representative of a failure, while a "0" is representative of a non-failure. One of ordinary skill in the art will recognize that other labeling schemes may be used to represent a failure or censor. Generally, the results determined by the data acquisition component for each case are stored indirectly or explicitly in the data repository for a specified period of time. Preferably, the data repository stores the data in a format that permits users to import the data into other tools for further analysis, such as Microsoft EXCEL, Minitab, and SAS.

Referring to FIG. 4, after the data acquisition component acquires the data, then it determines whether the data is any good at 68. Generally, the data are not good if no data records were retrieved, if the calculated age value is zero, or if the calculated age value is negative. In these situations, the data acquisition component removes the bad data at 70. In particular, the data acquisition component deletes the record if the calculated age value is zero or negative. After removing the bad data, the data acquisition component generates a data warning for this analysis case at 72. The number of records deleted from the data set because the calculated age value is zero or has a negative value is information that can be reported by the report generation component. After removing any bad records or if the data are good as determined at 68, then the data are evaluated for sufficiency at 74. If there are not enough data, then the statistical analysis component generates a data error at 76. Afterwards, the next case is obtained at 78 and a determination is made at 80 regarding the cases left. If there are more cases, then the data are acquired at 66 and blocks 68–74 are repeated until there are enough data.

Once it has been determined that there are enough data, then the statistical analysis component runs a statistical analysis at 82. As mentioned above, the statistical analysis includes constructing a Weibull distribution model from the ages and failure/censor information. The scale (eta) and shape (beta) parameters will define the Weibull distribution model results. The statistical model results are evaluated at 84 to determine if they are usable. If the results are not usable, then the statistical analysis component generates a statistical model error message at 86 and then proceeds to get the next analysis case at 78 and the above steps are repeated. The results are not usable for a Weibull distribution if the shape or scale parameter is outside realistic limits. The statistical analysis component may generate other statistical warnings indicating that the model is not a good approximation to the data or may require extrapolation to predict the results because there is insufficient history. However in these situations, the predictive reliability system can still forecast the future. All of warnings and errors can be reported by the report generation component. With a valid statistical model, then the simulation component predicts when the next failure will occur for each unit in the data set at 88. After the simulation has been run at 88, the simulation component then determines whether the predicted failures occurred after the end of the predetermined simulation time at 90. If the predicted failures do not occur after the end of the predetermined simulation time then the simulation component continues the simulation by assuming the component has been replaced on that unit and predicting the next failure at 92.

Figure 5:
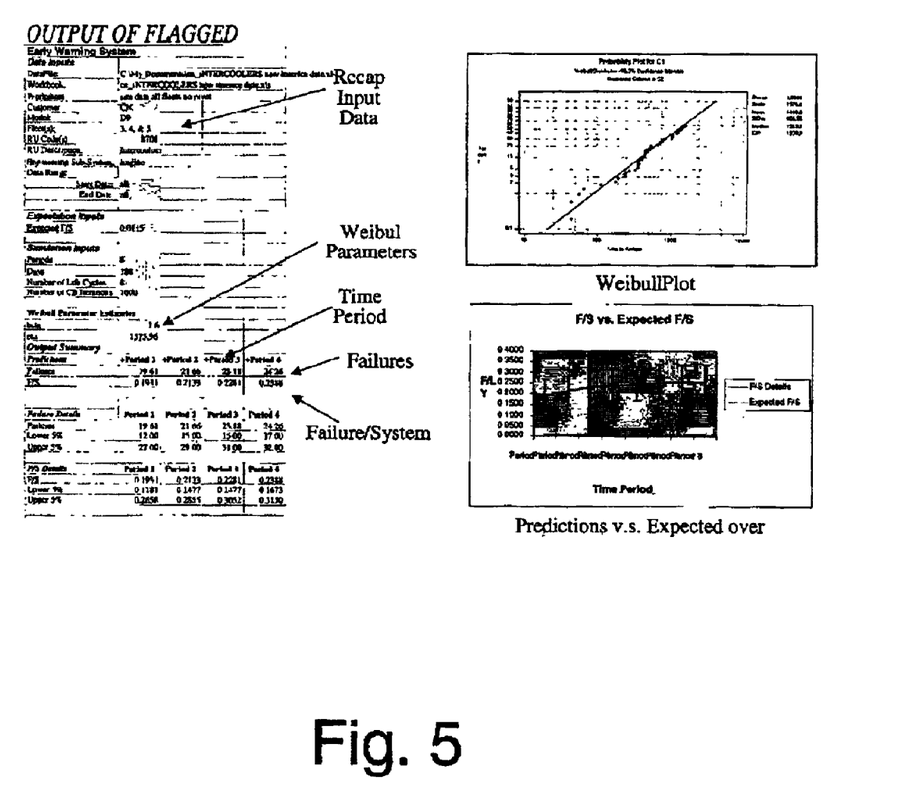
FIG. 5 shows an illustrative example of a report generated by the report generation component shown in FIG. 2.

Once the simulation component has determined that the predicted failures have occurred after the end of the predetermined simulation time then the report generation component compiles the results of the simulation at 94. As mentioned above, the report generation component compiles the results in a report containing a summary of the characteristics of the data set acquisition. This includes items such as the subsystem, component, customer(s), system model(s), date ranges, number of time periods, length of each time period, and expected failure per system for each time period or a constant expected failure per system year applied to all time periods. In addition, the summary may include items such as the Weibull distribution model parameters, the predicted number of failures by each time period, and calculated failure per system year for each time period based on the predicted failures. Furthermore, cumulative values of the predicted number of failures by each time period may be included in the summary. Further items in the summary may include a plot of the Weibull distribution model fit to the data. Note that the plot includes the confidence limits on the Weibull distribution model. Another plot that may be included in the summary is a graph of the predicted failure rate for the system compared with the expected failure rates for the system. Still another plot that may be shown in the summary is a graph of the cumulative predicted failure rate for the system compared with the cumulative expected failure rates for the system. Also, the summary may include any warnings generated during the data acquisition, statistical analysis or simulation. FIG. 5 shows an illustrative example of a report generated by the report generation component. One of ordinary skill in the art will recognize that other data may be used and that the formatting may be different.

Referring back to FIG. 4, after the report generation component has compiled the results, then the alert generation component determines if any of the predetermined flagging criteria has been met at 96. As mentioned above, the alert generation component determines if a predetermined flagging criteria is triggered by comparing the mean of the predicted failures to a predetermined allocation set for the component for each time period. If the mean of the predicted values exceeds the allocated value by more than a predetermined threshold percent, then the alert generation component 38 shall generate a flag. The alert generation component is not limited to only this of type of detection algorithm. One of ordinary skill in the art will recognize that a multiple of different detection algorithms may be used with the alert generation component. If flagging criteria have been met as determined at 96, then the report generation component notifies a user or user groups of the analysis cases that are responsible for the alerts at 98. One of ordinary skill in the art will recognize, that the system may opt to defer the actual notification to users and create notifications which include a batch of alerts for each user to economize the actual alert messages generated and to facilitate the recipients' processing of alerts. Several batching strategies exist including creating alert batches at the completion analysis of all the cases for a selected run, or creating batches once per day or once per week.

After notifying the user at 96 or if it is determined that the flagging criteria have not been met, then the next case is retrieved at 78. Again, a determination is made at 80 to decide whether there are any more cases. If there are more analysis cases or additional components to analyze then the process is repeated again. When there are no more cases to analyze, then an analysis report is generated at 100. Among the items described above, the analysis report describes the number of cases and the number of flagged cases according to the subsystem, model, customer, etc. In addition, the report contains links to various sections of the report provided in the dynamic web pages. After the report has been generated, the report generation component stores it in the data repository for a specified period of time. The analysis report may be organized in several views, such as by date, by subsystem, by component, by customer or other factors which differentiate the cases including combinations of factors. The analysis report may include hierarchical views, such as first by date, then component, then customer.

The foregoing flow charts of this disclosure show the functionality and operation of the predictive reliability system. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as C++ or JAVA; however, other languages can be used. Also, the data repositories may be constructed using commercial databases including standard relational, object-oriented or hierarchical databases. Data manipulation operations, including retrieval, creation, modification, and deletion, can be implemented within the programming languages or within the database using stored procedures or triggers or combinations.

The above-described predictive reliability system comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a predictive reliability system, method and computer product. While the invention has been particularly shown and described in conjunction with a preferred embodiment thereof, it will be appreciated that variations and modifications can be effected by a person of ordinary skill in the art without departing from the scope of the invention.

What is claimed is:

1. A system for performing automated predictive reliability on a complex system having a plurality of subsystems and a plurality of components within each subsystem, comprising:
   a data acquisition component that acquires service data for the plurality of components of at least one of the plurality of subsystems and determines age information and failure information from the service data for each of the plurality of components;
   a statistical analysis component that generates a statistical model according to the age information and failure information;
   a simulation component that predicts future failures for the life cycle of the plurality of components according to the statistical model; and
   an alert generation component that generates alerts for the predicted future failures.

2. The system according to claim 1, wherein the statistical model comprises a Weibull distribution model.

3. The system according to claim 1, further comprising a report generation component that compiles results produced from the simulation component.

4. A system performing automated predictive reliability on a complex system having a plurality of subsystems and a plurality of components within each subsystem, comprising:
   at least one data repository containing a plurality of service data for the plurality of subsystems and components;

a predictive reliability system that predicts the reliability for the plurality of components of at least one of the plurality of subsystems according to the plurality of service data, the predictive reliability system comprising a data acquisition component that acquires the plurality of service data from the at least one data repository and determines age information and failure information from the service data for each of the plurality of components; a statistical analysis component that generates a statistical model according to the age information and failure information; and a simulation component that predicts future failures for the life cycle of the plurality of components according to the statistical model; and an alert generation component that generates alerts for failures and incipient failures for the complex system from the predicted reliability; and a first computing unit configured to serve the at least one data repository and the predictive reliability system.

5. The system according to claim 4, wherein the at least one data repository stores historical failure data for the complex system.

6. The system according to claim 4, wherein the at least one data repository stores analysis data for the complex system including data for subsystems and components that form the complex system.

7. The system according to claim 4, wherein the statistical model comprises a Weibull distribution model.

8. The system according to claim 4, wherein the predictive reliability system further comprises a report generation component that compiles results produced from the simulation component.

9. The system according to claim 4, further comprising a second computing unit configured to interact with the at least one data repository and the predictive reliability system served from the first computing unit over a network.

10. The system according to claim 4, further comprising an on-demand analyzer that enables a user to perform ad hoc analysis on the complex system.

11. The system according to claim 4, wherein the at least one data repository stores corrective actions for servicing any predicted problems.

12. The system according to claim 11, wherein the predictive reliability system provides a candidate set of corrective actions for servicing any predicted problems.

13. A method performing automated predictive reliability on a complex system having a plurality of subsystems and a plurality of components within each subsystem, comprising:

acquiring service data for the plurality of components of at least one of the plurality of subsystems;

determining age information and failure information from the service data for the plurality of components;

generating a statistical model according to the age information and failure information;

predicting future failures for the life cycle of the plurality of components according to the statistical model;

determining a plurality of statistics for the predicted future failures; and issuing alerts for the predicted future failures.

14. The method according to claim 13, further comprising compiling the predicted future failures into a report.

15. The method according to claim 13, wherein the statistical model comprises a Weibull distribution model.

16. A computer-readable medium storing computer instructions for instructing a computer system to perform automated predictive reliability on a complex system having a plurality of subsystems and a plurality of components within each subsystem, the computer instructions comprising:

acquiring service data for the plurality of components of at least one of the plurality of subsystems;

determining age information and failure information from the service data for the plurality of components;

generating a statistical model according to the age information and failure information;

predicting future failures for the life cycle of the plurality of components according to the statistical model; and issuing alerts for the predicted future failures.

17. The computer-readable medium according to claim 16, further comprising instructions for compiling the predicted future failures into a report.

18. The computer-readable medium according to claim 16, wherein the statistical model comprises a Weibull distribution model.

* * * * *